United States Patent
O'Donncha et al.

(10) Patent No.: US 12,124,961 B2
(45) Date of Patent: Oct. 22, 2024

(54) SYSTEM FOR CONTINUOUS UPDATE OF ADVECTION-DIFFUSION MODELS WITH ADVERSARIAL NETWORKS

(71) Applicant: INTERNATIONAL BUSINESS MACHINES CORPORATION, Armonk, NY (US)

(72) Inventors: Fearghal O'Donncha, Aran Islands (IE); Ambrish Rawat, Dublin (IE); Sean A. McKenna, Reno, NV (US); Mathieu Sinn, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 783 days.

(21) Appl. No.: 17/133,472

(22) Filed: Dec. 23, 2020

(65) Prior Publication Data

US 2022/0198278 A1   Jun. 23, 2022

(51) Int. Cl.
*G06N 3/088* (2023.01)
*G06N 3/042* (2023.01)
*G06N 3/045* (2023.01)

(52) U.S. Cl.
CPC ............ *G06N 3/088* (2013.01); *G06N 3/042* (2023.01); *G06N 3/045* (2023.01)

(58) Field of Classification Search
CPC ........ G06N 3/042; G06N 3/045; G06N 3/047; G06N 3/08; G06N 3/088; G06N 7/01
See application file for complete search history.

(56) References Cited

U.S. PATENT DOCUMENTS

| | | |
|---|---|---|
| 5,801,969 A | 9/1998 | Nagahama |
| 8,756,040 B2 | 6/2014 | Cruz |
| 9,046,881 B2 | 6/2015 | Blevins et al. |
| 9,514,256 B1 | 12/2016 | Kolar et al. |
| 9,619,594 B1 | 4/2017 | Dow et al. |
| 10,552,537 B2 | 2/2020 | Jochim et al. |
| 2013/0024170 A1 | 1/2013 | Dannecker et al. |
| 2018/0121389 A1* | 5/2018 | Jochim ............... G06F 40/279 |

(Continued)

FOREIGN PATENT DOCUMENTS

| | | |
|---|---|---|
| EP | 2237068 B1 | 4/2013 |
| WO | 2014/155330 A2 | 10/2014 |

OTHER PUBLICATIONS

Wang et al., "Physics-Informed Neural Network Super Resolution for Advection-Diffusion Models", Dec. 12, 2020, arXiv: 2011.02519v2, pp. 1-9. (Year: 2020).*

(Continued)

*Primary Examiner* — Brent Johnston Hoover
(74) *Attorney, Agent, or Firm* — Intelletek Law Group, PLLC; Gabriel Daniel, Esq.

(57) ABSTRACT

A computing device configured for automatic selection of model parameters includes a processor and a memory coupled to the processor. The memory stores instructions to cause the processor to perform acts including providing an initial set of model parameters and initial condition information to a model based on historical data. A model generates data based on the model parameters and the initial condition information. After determining whether the model-generated data is similar to an observed data, updated model parameters are selected for input to the model based on the determined similarity.

20 Claims, 8 Drawing Sheets

(56) References Cited

U.S. PATENT DOCUMENTS

2020/0012900 A1* 1/2020 Walters .................. G06N 20/00
2020/0293594 A1* 9/2020 Raissi .................... G06F 30/27

OTHER PUBLICATIONS

Zhang et al., "MetaGAN: AnAdversarial Approach to Few-Shot Learning", Dec. 3, 2018, NIPS'18: Proceedings of the 32nd International Conference on Neural Information Processing Systems, pp. 1-10. (Year: 2018).*

Mell, P. et al., "Recommendations of the National Institute of Standards and Technology"; NIST Special Publication 800-145 (2011); 7 pgs.

Finn, C. et al., "Model-Agnostic Meta-Learning for Fast Adaptation of Deep Networks"; Proceedings of the 34th International Conference on Machine Learning (2017); Sydney, Australia, PMLR 70, 2017; 10 pgs.

Al-Shedivat, M. et al., "Continuous Adaptation via Meta-Learning in Nonstationary and Competitive Environments"; ICLR (2018); 21 pgs.

Louppe, G. et al., "Adversarial Variational Optimization of Non-Differentiable Simulators"; Proceedings of the 22nd International Conference on Artificial Intelligence and Statistics (AISTATS—2019); vol. 59; 10 pgs.

Khodayi-Mehr R. et al., "Model-Based Learning and Control of Advection-Diffusion Transport Using Mobile Robots"; Duke University (2019); 285 pgs.

Stanev, V.G. et al., "Identification of Release Sources in Advection-Diffusion System by Machine Learning Combined with Green's Function Inverse Method"; Applied Mathematical Modelling (2018); vol. ; pp. 64-76.

Wikle, C.K., "Bayesian Hierarchical Models: A Brief Introduction"; University of Missouri-Columbia (2006); 41 pgs.

Anonymous, "Predictive Modeling Platform with Incremental Data Updates"; IP.com No. IPCOM000243011D (2015); 2 pgs.

Anonymous, "Method for Automated Probabilistic Model Selection"; IP.com No. IPCOM000256808D (2019); 5 pgs.

Anonymous, "Model Parameter Identification Methodology to Match Model and Test Data"; IP.com No. IPCOM000216000D (2012); 6 pgs.

* cited by examiner

200

GUIDING A WEATHER MODEL TO GENERATE SYNTHETIC WEATHER DATA AND IS ACHIEVED VIA THE FOLLOWING OPERATIONS:

205

Operation 1 (Offline mode) : The weather model, sampler and ML classifier are trained on historical weather data using a Generative Adversarial Net (GAN)-like setup. In this phase, the meta-learner is passive and the update operations may use classical GAN training algorithms.

215

Operation 2 (Offline mode): The training information from Operation 1 is used for learning the meta-learning. This is the training phase of the meta-learner. Algorithms can be used to execute this operation, including Model-agnostic meta learning, and continuous adaptation via meta-learning.

225

Operation 3 (Online mode) : The system is then deployed in an online non-stationary setting where the meta-learner guides the updates of ML classifier and Sampler in order to predict useful weather data

AN ADVECTION-DIFFUSION MODEL (ADM) FOR WEATHER

- 305 — Offline mode: Monte-Carlo runs of the PDE provide synthetic data for learning the ML classifier, sampler and Meta learner
- 310 — Online mode: The online mode sheds away from Monte-Carlo simulations of The ADM and relies on model parameters and initial conditions obtained from the sampler
- ML Classifier + Sampler
  - 315 — Together these components form the discriminator-generator models of a Generative Adversarial Network
    - ML Classifier could be embodied by a Neural Network
    - Sampler could be any parametric/analytical model from which a set of user parameters and/or initial conditions can be sampled
- 320 — Since advection diffusion models are classically non-differentiable or the numerical differentiation is computationally expensive, alternate strategies need to be used to update the user parameters
- 325 — Offline mode: During the offline model this is trained using the GAN setup on a large amount of historical observations
- 330 — Online mode: Mostly involves forward passes of ML classifier and Sampler to get latest set of user parameters. The updates are determined by the meta-learner

META LEARNER

335 — • Inputs to the meta learner include
- Parameter embeddings of ML Classifier and Sampler
- Gradients used in the last update of ML classifier or Sampler
- Value of GAN-loss function
- Output of the meta learning is a policy that details the actions for updating parameters of sampler and ML classifier 340 — • Offline mode
- The meta learner is trained in parallel with the GAN training of ML classifier and sampler 345 — • Online mode
- The meta-learner guides the updates of sampler and ML classifier
- The new datapoints obtained for ML classifier and Sampler updates can be used to further improve the meta-learner
- This can be similar to "execution" phase of meta-learner

FIG. 3B

SYSTEM FOR CONTINUOUS UPDATE OF ADVECTION-DIFFUSION MODELS WITH ADVERSARIAL NETWORKS

BACKGROUND

Technical Field

The present disclosure generally relates to data-generating models, and more particularly, to adjusting model parameters with Adversarial Networks.

Description of the Related Art

There is a growing need in a large number of applications for precise and detailed results from large scale model simulations. In modeling systems that use machine learning, an Adversarial Network type approach has been developed in which a generative model is used to generate data, and a discriminator model is used to evaluate the quality of the generated data. When the discriminator determines that the model-generated data is "real" (comparing the similarity with actual observed data), the model parameters are considered to be calibrated.

Such large scale model simulations are often based on resolving a set of partial differential equations (PDEs) that represent the physics of the system and include a set of input parameters that are tuned during a calibration phase of the model configuration until a set of model outputs consistently replicate a given observation or ground-truth dataset. The configuration and parameterization of these models are complex and non-stationary in both time and space, and often do not provide accurate results as conditions change.

For example, model parameters are selected during calibration based on comparing a model output against measurements. Due to the non-stationarity of such systems for generating models, a three-stage approach is adopted in which the model results with selected parameters compared against three independent datasets (e.g., model calibrated, model verified, and model validated) that are time consuming and labor intensive.

A number of static self-tuning systems have been created in an attempt to improve the accuracy of models, including methods such as Monte-Carlo, Adjoint/Inverse, Design of Experiment, and Parameter Estimate Code (PEST) style approaches. However, all of the aforementioned approaches are computationally very expensive. The tuning of the model parameters in the conventional systems is not performed automatically. Thus, as the generated data "drifts" in terms of similarity from observed data, the accuracy of the model decreases.

SUMMARY

According to one embodiment, a computing device configured for automatic selection of model parameters includes a processor and a memory coupled to the processor. The memory stores instructions to cause the processor to perform acts including providing to a model an initial set of model parameters and an initial condition information based on historical data. A model data is generated based on the model parameters and the initial condition information. After determining a similarity of the model-generated data and an observed data, updated model parameters are selected for input to the model based on the determined similarity. There is an improvement in the accuracy of the data generated by the model by updating the model parameters.

In one embodiment, the computing device is configured to dynamically update the model parameters based on a detected change in the initial condition information. A dynamic update can address drift in the model during operation, which is an improvement over the conventional models.

In one embodiment, the computing device is configured to update the model parameters at a user-defined or a machine-guided time period. Periodic updating improves the accuracy of the model so that the drift does not become too large, making the data generated by the model inaccurate for use.

In one embodiment, the computing device is configured to train a meta-learner with training information comprising historical data. As conventionally a meta-learner is not used, the computing device provides a more accurate model.

In one embodiment, the computing device is configured to train the meta-learner to update the model parameters based on a performance of a known discriminator and similarities to the observed data. A more accurate model results from the training of the meta-learning to update the model parameters.

In one embodiment, the instructions cause the processor to provide updated training information to the meta-learner including inputs and outputs of the model, and providing a sampler with updated model parameters from the meta-learner for input to the model. The sampler works with the meta-learner to improve the accuracy of the model by updating the model parameters.

In one embodiment, the instructions cause the processor to perform time-dependent partial differential equations (PDE) to create the model-generated data. A PDE model provides advantages in accuracy over some other models.

In one embodiment, the instructions cause the processor to create the model-generated data by operating an advection-diffusion model (ADM). The ADM is particularly suitable for weather applications in which a model generates future weather data.

In an embodiment, a system for automatically updating model parameters, the system includes a model configured to generate an output data based on a received input of a set of initial conditions and model parameters. A machine learning (ML) classifier is configured to generate a score indicating whether the output data generated by the model output is a simulated data or an observed data. A sampler is configured to output a set of model parameters for input to the model. A meta-learner configured to receive training data including input and output data of the ML classifier and the sampler, the meta-learner outputs update operations for the ML classifier and the sampler to update the model parameters input to the model. A more accurate model that does not suffer from "drift" in the correctness of the model-generated data is an improvement over known systems.

In one embodiment, the ML classifier is configured with historical training data using an Adversarial Network (AN) training algorithm.

In one embodiment, the meta-learner is configured with historical training data using at least one of a model-agnostic meta-learning algorithm or a continuous adaptation meta-learning algorithm. The use of one or more of the model-agnostic or continuous adaptation meta-learning algorithm provides a more accurate model.

In an embodiment, the model is configured to generate future weather data as the output data. Through the use of the model, the future weather data will be more accurate than systems in which there is a drift of the accuracy of the data.

In an embodiment, the meta-learner is configured to receive inputs of parameter embeddings of the sampler and the ML classifier, gradients used in a latest update of the sampler and the ML classifier, and a value of an Adversarial Network loss function. All of the inputs mentioned, alone or in any combination, provide for a more accurate model.

In one embodiment, a computer-implemented method of automatic updating of model parameters includes inputting, by a sampler, an initial condition information and model parameters to a model. The model generates data based on the model parameters and the initial condition information. A machine learning (ML) classifier determines whether the model-generated data is similar to an observed data. A meta-learner, updates the model parameters input to the model based on the similarity of the model-generated data to the observed data. A more accurate model-generated data is one improvement over known methods.

In an embodiment, the model parameters are updated based on a detected change in the initial condition information. The amount of "drift" in the accuracy of model-generated data is improved by monitoring a change in the initial conditions.

In an embodiment, the model, the sampler and the ML classifier are trained offline with historical training data using an Adversarial Network (AN) training algorithm. A model with improved accuracy results from such training.

In an embodiment, the meta-learner is trained with training information comprising historical data. The meta-learner provides an improvement in the operation of the model because the model parameters can be updated.

In an embodiment, the training of the meta-learner includes updating model parameters is based on performance of a known discriminator and similarities to the observed data. The use of a known discriminator improves the accuracy of the model-generated data.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 2 illustrates a weather model application, consistent with an illustrative embodiment.

FIG. 3A is a description of a training operation for an advection-diffusion model in a weather application, consistent with an illustrative embodiment.

FIG. 3B is a description of the training of the meta-learner, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

In the present disclosure, models such as a partial differential equation (PDE) model is used for data generation, and a machine learning (ML) classifier is used for determining a similarity of the model-generated data with actual observed data. In addition, a meta-learner is trained for use in model parameter selection and subsequent updating of model parameters. The updating may be based on a change in the initial conditions provided to the model. The updating may also be based on a change of model parameters provided to the PDE model. The updating may also be based on the results of the ML classifier. For example, if a similarity score indicates the model-generated data is not similar to actual observed data, a recalibration may be in order, and the meta-learner is trained to update the model parameters input to the PDE model. The meta-learner may dynamically update the model parameters based on the ML classifier similarity scores, and may update at predetermined time intervals that are user-selected or machine-selected.

The computer-implemented method and device of the present disclosure provide for an improvement in the fields of modeling, including but not limited to advection-diffusion modeling and other types of modeling using Adversarial Network type approaches. Whereas conventional modeling typically uses data scientists and subject matter experts to set modeling parameters, the present disclosure is an improvement by permitting both automatic selection and automatic update of model parameters, permitting more accurate model-generated simulated data. The automatic updating, which may be performed in response to detecting changing conditions, or detecting that a similarity between model-generated simulated data and actual observed data is decreasing, or at user or system selected time intervals, provides for improved model accuracy with less computational overhead. Thus, the present disclosure provides both an improvement in the fields of modeling and model-generated data, and there is an improvement in computer operations, as fewer computer resources (e.g., processing, storage) are used than in conventional modeling operations with more accurate results.

Example Architecture

Figure 1:
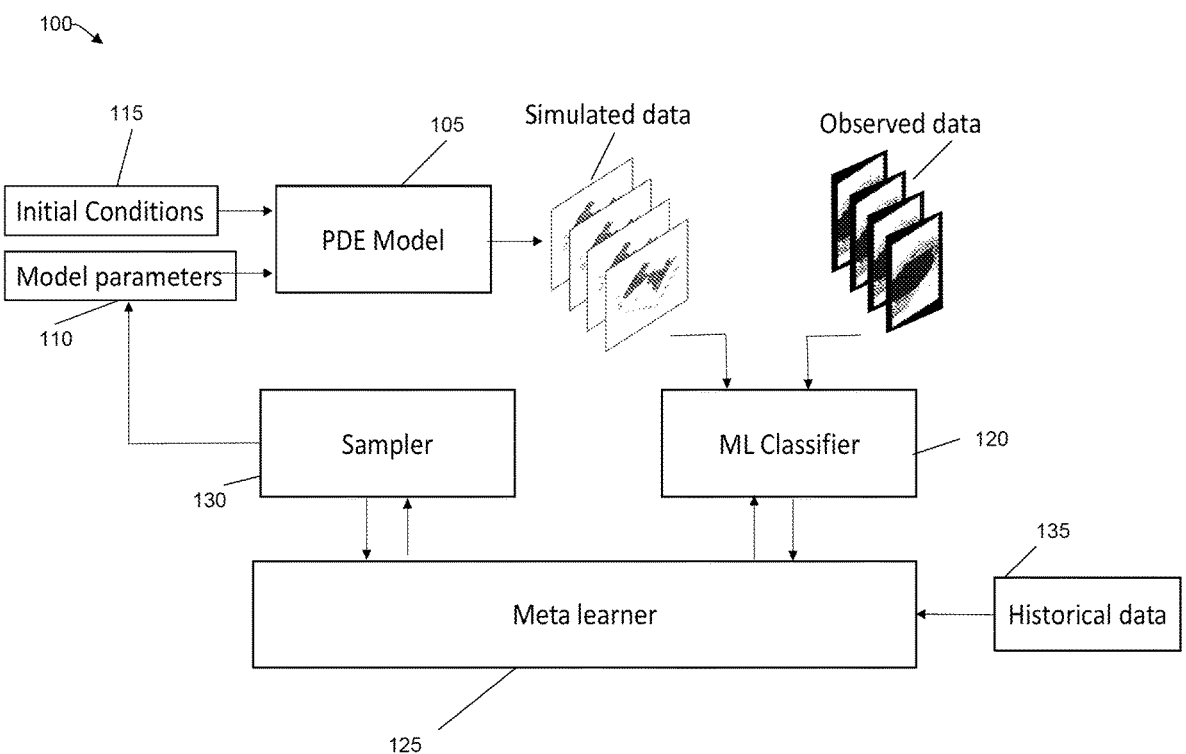
FIG. 1 provides an architectural overview of a system configured for automatic selection of model parameters, consistent with an illustrative embodiment.

FIG. 1 provides an architectural overview of a system configured for automatic selection of model parameters, consistent with an illustrative embodiment. FIG. 1 shows a model 105 that generates simulated data based on the model parameters 110 and the initial condition information 115. The model 105 shown is a partial differential equation (PDE) model, other types of models can have their model parameters automatically selected and adjusted consistent with this illustrative embodiment.

The machine learning (ML) classifier 120 is, for example, a binary classifier that is configured to predict whether the output generated by the model is real or synthetic. In other words, in the field of model generation, the observed data shown in FIG. 1 is considered real data, and the synthetic data is the simulated data generated by the model 105. In general, in an Adversarial Network setting, there can be model-generated simulated data (e.g., samples) of an image, the simulated data being differentiated from the original image(s) being used. Moreover, in the case of using two neural networks, one network is a model generator, and another network is a discriminator that classifies the generated data. Thus, ML classifier 120 determines a similarity of the simulated data to the observed data, and generates a score corresponding to the amount of similarity. For example, a "0" may mean no similarity, and a "1" may mean the similarity is substantially the same as the observed data.

Still referring to FIG. 1, the sampler 130 is configured to provide initial conditions and set model parameters that are input to the PDE model 105 to generate the simulated data output by the PDE model 105. In conjunction with the meta-learner 125, a type of feedback loop is formed, where the meta-learner 125 provides instructions to the sampler 130 to update the model parameters input to the PDE model 105 to change a similarity of the data being output by the PDE model 105. The model parameters are adjusted during the operation of the PDE model 105 and provided by the sampler 130 to the PDE model 105, and the meta-learner 125 identifies a drift in the similarity score provided by the ML classifier 120 to update the model parameters.

The meta-learner 125 receives training data from several sources, including historical data 135, the sampler 130, and the ML classifier 120, as well as the inputs and outputs of the sampler 123 and ML classifier 120. The meta-learner 125 is trained to output update operations for the ML classifier 120 and the sampler 130 to guide the generation of simulated data. For example, the meta-learner 125 is trained to guide the update of model parameters based on known discriminator performance and similarities to observed data. In an illustrative embodiment, the generated simulated data is future weather data. The initial calibration of the model parameters is typically performed offline, as is the training of the meta-learner 125. In an illustrative embodiment, the PDE model 105, the sampler 130 and the ML classifier 120 are trained on historical data 135 offline, while the meta-learner 125 is trained using training information generated from the training of the PDE model 105, the classifier 120, and the sampler 130.

FIG. 2 illustrates a weather model application, consistent with an illustrative embodiment. A weather model generates synthetic weather data that can be used for forecasting that is compared with observed data for similarity as discussed herein above. In operation 1 (205), a weather model, which may be an advection-diffusion model, or a partial differential equation (PDE) model, the sampler 130 (FIG. 1), and the ML classifier 120 are trained on historical weather data using a Generative Adversarial Network (GAN)-like setup. The training operation may use classical GAN training algorithms. The training is performed offline, and the meta-learner 125 is passive during the first training operation.

In operation 2 (215), the training information from Operation 1 is used to train the meta-learner 125. The types of algorithms that can be used to execute operation 2 include, for example, a continuous adaptation via meta-learning, and a Model-agnostic meta-learning. The system is offline during the training of the meta-learner 125.

In operation 3 (225), the system is deployed online in a non-stationary setting. The meta-learner, which has been trained in Operation 2 (215), guides the updates of the ML classifier 120 and the sampler 130 to predict weather data.

FIG. 3A is a description of a training operation for an advection-diffusion model (ADM) in a weather application, consistent with an illustrative embodiment.

In an offline mode 305, there are performed Monte-Carlo runs of the PDE model. A Monte Carlo simulation is a model that is used to predict the probability of various outcomes when the intervention of random variables is present. A Monte Carlo simulation is used to analyze the impact of risk and uncertainty in prediction and forecasting models. In this illustrative embodiment, the Monte-Carlo runs of the PDE model provide synthetic data for training the ML classifier 120, the sampler 130, and the meta-learner 125 (FIG. 1).

In an online mode 310, the model parameters and initial conditions obtained from the sample 125 are input to the ADM and in place of the Monte-Carlo simulations.

At 315, the ML classifier 120 and the sample 130 form the discriminator-generator models of an Adversarial Network (AN). The ML classifier 120 may be realized as a neural network, and the sampler 130 can be any parametric/analytical model that can be used to sample initial conditions or user parameters.

At 320, it is explained that ADM's are normally non-differential, and the few ADMS that are not non-differential are considered computationally expensive to operate. Therefore, at 325 the ADM is trained using a GAN setup on a large amount of historical observations.

At 330, a number of forward passes of the ML classifier 120 and the sampler 130 are performed the latest set of user parameters, and the updates are determined by the meta-learner 125.

FIG. 3B is a description of the training of the meta-learner, consistent with an illustrative embodiment. At 335, the inputs to the meta-learner 125 include parameter embeddings of the ML classifier 120 and the sampler 130, gradients used in the last update of the ML classifier 120 or sampler 130, and the value of a GAN-loss function. The GAN loss function is selected to represent the specific probability distribution of the synthetic and generated data. A loss function that might be selected for this illustrative example is a minimal or Wasserstein loss function. The output of the meta-learning is a police detail regarding actions for updating the parameters of the sampler 120 and the ML classifier 130.

At 340, it is disclosed in offline mode that the meta-learner 130 is trained in parallel with the GAN training of the ML classifier 120 and the sampler 130. It is to be understood that the meta-learner 130 can be trained parallel to or subsequent to the training of the ML classifier 120 and the sampler 130.

At 345, several online operations are described. For example, the meta-learner 130 guides the updates of the sampler 130 and ML classifier 120. The meta-learner can be improved with using new datapoints obtained for the ML classifier 120 and the sampler 130.

Example Process

With the foregoing overview of the example architecture, it may be helpful now to consider a high-level discussion of an example process. To that end, in conjunction with FIGS. 1-3A and 3B, FIG. 4 depicts a flowchart 400 illustrating various aspects of a computer-implemented method, consistent with an illustrative embodiment. Process 400 is illustrated as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 4:
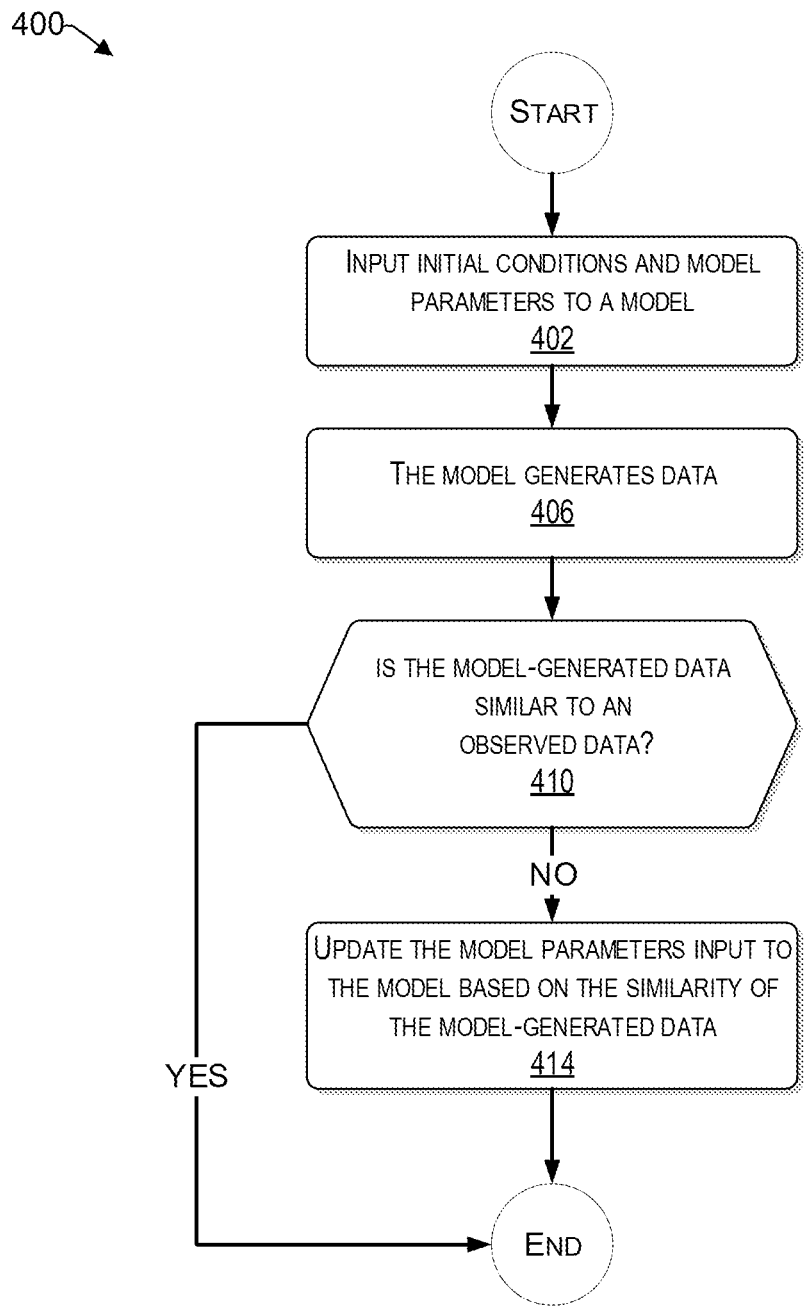
FIG. 4 is a flowchart illustrating a computer-implemented method, consistent with an illustrated embodiment.

Referring now to FIG. 4, at operation 402, initial conditions and model parameters are input to a model to calibrate the model. The initial conditions may include observed data. For example, in the case of a weather application, initial conditions can include information about the weather at different months of the year. A sampler is configured to provide initial conditions and set model parameters that are input to the model.

At operation 406, the model generates data based on the initial conditions and the model parameters. The model may be, for example a PDE model such as shown in FIG. 1. The model generates simulated data based in part on the initial conditions (which many include observed data), and the model parameters.

At operation 410, it is determined whether the model-generated data is similar to the observed data. Referring to FIG. 1, an ML classifier 120 compares the simulated data generated by the model with observed data. The ML classifier will output a similarity score range from, for example, no similarity to complete similarity. It is to be understood that the range can be user-defined.

With regard to operation 410, in the event that the model generated is similar to the observed data, for example, by a predetermined similarity score (e.g., 0.8 or high on a scale of 0 to 1), then operations end until, for example, more data is generated by the model, or a predetermined period of time has elapsed.

However, if there is no similarity with the observed data, or the similarity score is below a predetermined threshold, the model parameters are updated. The predetermined threshold is, for example, an amount of "drift" between the model-generated data the observed data that is addressed by tuning the model with updated parameters. At operation 414, the instructions for updated model parameters are generated by the meta-learner 125 (FIG. 1) and provided to the sampler 130. The sampler 130 provides the updated model parameters to the model. As the model generates data, the ML classifier 120, meta-learner 125, and sampler 130 form a feedback loop to adjust the model parameters automatically.

Example Particularly Configured Computer Hardware Platform

Figure 5:
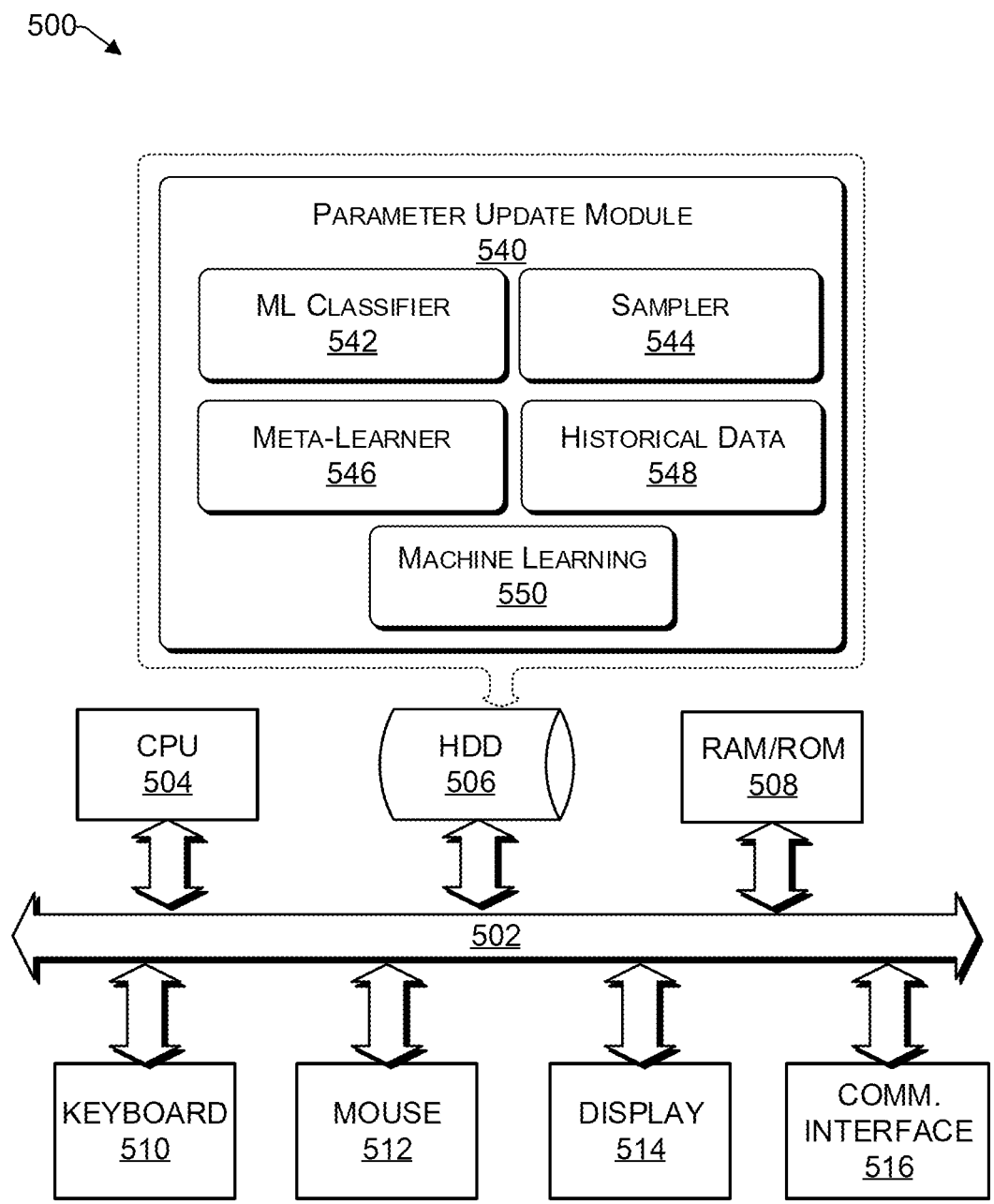
FIG. 5 is a functional block diagram illustration of a computer hardware platform for automatic selection and update of model parameters, consistent with an illustrative embodiment.

FIG. 5 provides a functional block diagram illustration 500 of a computer hardware platform. In particular, FIG. 5 illustrates a particularly configured network or host computer platform 500, as may be used to implement the methods shown in FIG. 4.

The computer platform 500 may include a central processing unit (CPU) 504, a hard disk drive (HDD) 506, random access memory (RAM) and/or read-only memory (ROM) 508, a keyboard 510, a mouse 512, a display 514, and a communication interface 516, which are connected to a system bus 502. The HDD 506 can include data stores.

In one embodiment, the HDD 506, has capabilities that include storing a program that can execute various processes, such as machine learning classification, sampling, meta-learning, selecting, and updating model parameters.

The parameter update module 540, in a manner described herein above, is configured to manage the overall process.

The ML classifier module 542 is configured to compare model generated simulated data with observed data and determine a similarity. For example, ML classifier module 542 can generate a similarity score, and in an illustrative embodiment, a "0" means no similarity, and a "1" is completely similar.

The meta-learner module 546 is trained to provide automatic selection and automatic update of model parameters. The meta-learner module 546 components take as input training information of the ML classifier module 542 and the sampler module 544. The meta-learner module 546 provides the updates for the ML classifier module 542 and the sampler 544 for guiding the operation of a model (e.g., a PDE model).

The historical data 548 provides training data for the meta-learner module 546. The machine learning module 550 is used to train the ML classifier, the sampler 544, and the meta-learner 546.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
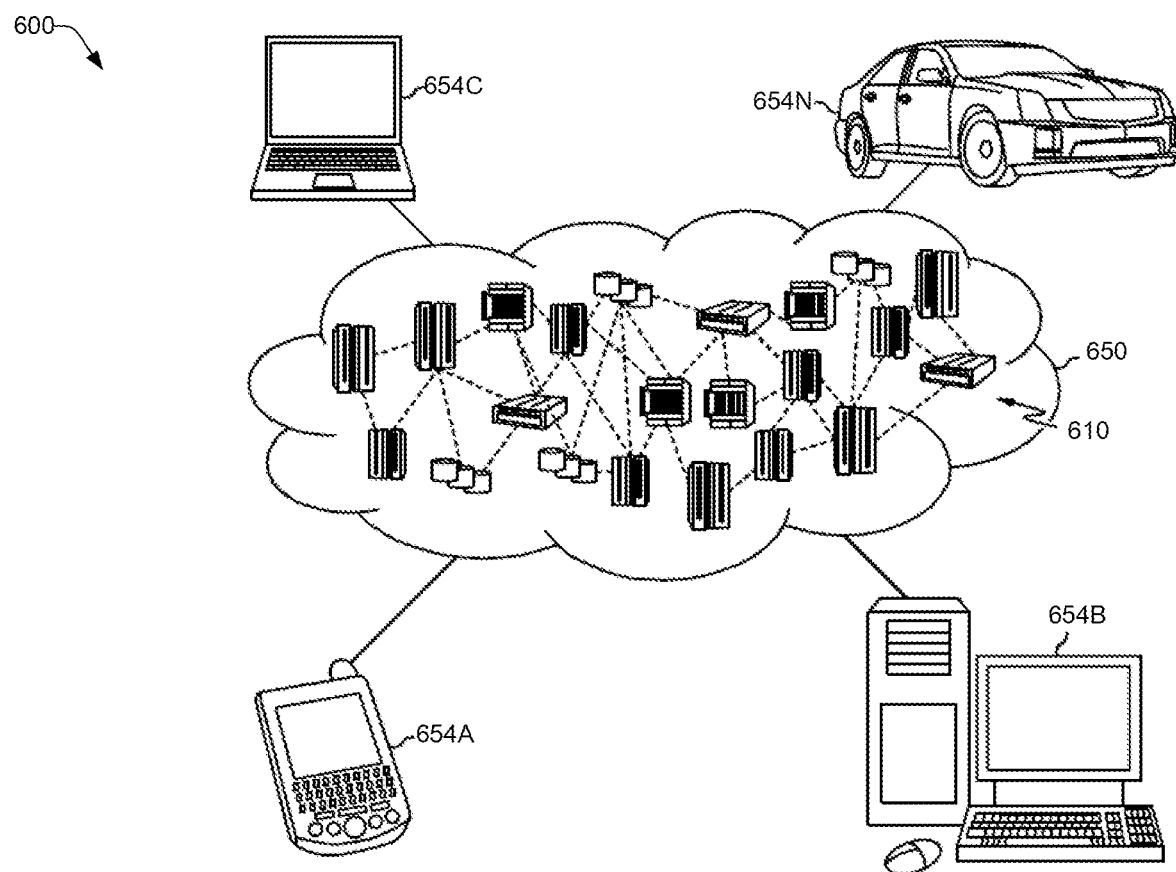
FIG. 6 depicts an illustrative cloud computing environment, consistent with an illustrative embodiment.

Referring now to FIG. 6, an illustrative cloud computing environment 600 utilizing cloud computing is depicted. As shown, cloud computing environment 600 includes cloud 650 having one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms, and/or software as services for which a cloud consumer does not need to maintain resources on a local computing device. It is understood that the types of computing devices 654A-N shown in FIG. 6 are intended to be illustrative only and that computing nodes 610 and cloud computing environment 600 can communicate with any type of computerized device over any type of network and/or network addressable connection (e.g., using a web browser).

Figure 7:
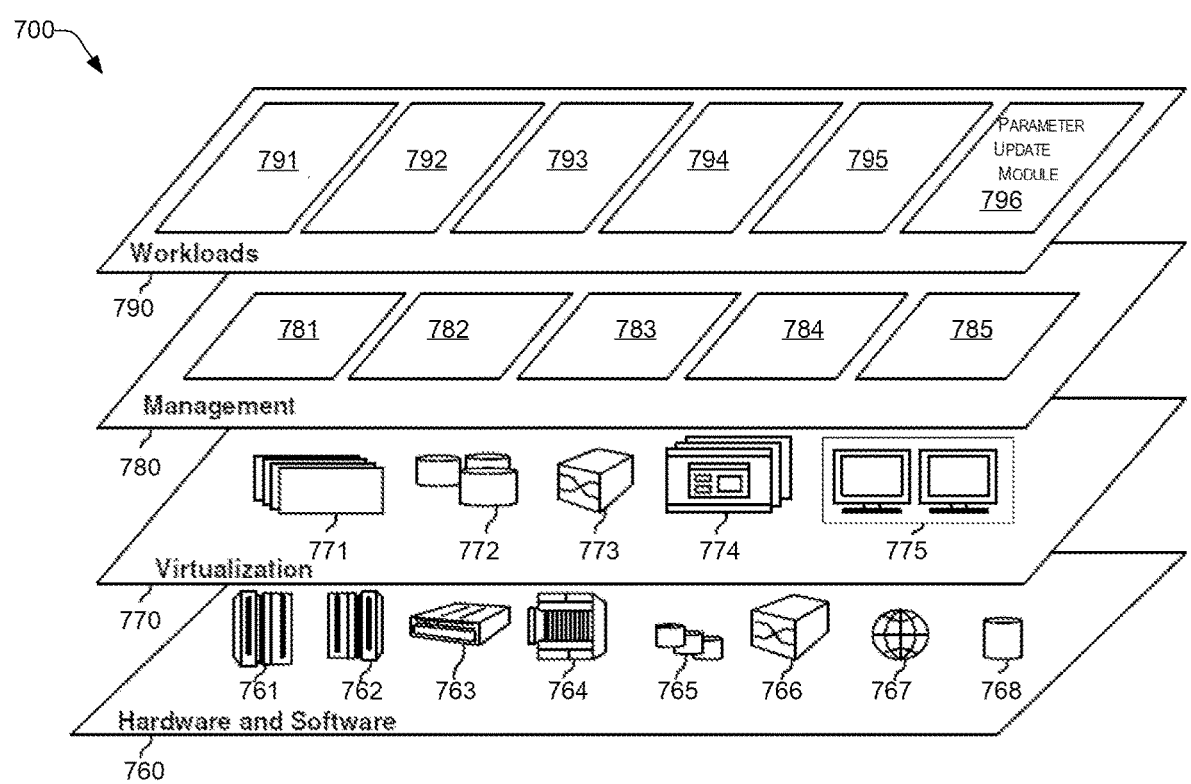
FIG. 7 depicts a set of functional abstraction layers provided by a cloud computing environment, consistent with an illustrative embodiment.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 include hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and a parameter update module 796 configured to determine a similarity between model-generated data and observed data, and to update model parameters as discussed herein above.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computing device configured for automatic selection of model parameters, the computing device comprising:
    a processor;
    a memory coupled to the processor, the memory storing instructions to cause the processor to perform acts comprising:
    providing an automatically selected initial set of model parameters and an initial condition information to a model, based on a historical data;
    iteratively training a meta-learner using a generative adversarial (GAN) training, comprising:
        generating model data based on the model parameters and the initial condition information;
        determining a similarity between the model-generated data and an observed data by a machine learning classifier; and
        selecting updated model parameters for input to the model based on the determined similarity of the model-generated data to the observed data by a meta-learner,
    wherein the meta-learner is trained in parallel with the GAN training of the machine learning classifier.

2. The computing device of claim 1, wherein the instructions cause the processor to perform an additional act comprising:
    dynamically updating the model parameters based on a detected change in the initial condition information.

3. The computing device of claim 1, further comprising updating the model parameters at a user-defined or a machine-guided time period.

4. The computing device of claim 1, wherein the instructions cause the processor to perform an additional act comprising:
    training a meta-learner with training information comprising the historical data.

5. The computing device of claim 4, wherein the training of the meta-learner includes updating the model parameters based on a performance of a known discriminator and similarities to the observed data.

6. The computing device of claim 4, wherein the instructions cause the processor to perform additional acts comprising:
    providing updated training information to the meta-learner including inputs and outputs of the model; and
    providing a sampler with updated model parameters from the meta-learner for input to the model.

7. The computing device of claim 1, wherein the instructions cause the processor to perform time-dependent partial differential equations (PDE) to create the model-generated data.

8. The computing device of claim 1, wherein the instructions cause the processor to create the model-generated data by operating an advection-diffusion model.

9. A system for automatically updating model parameters, the system comprising:
a model configured to generate an output data based on a received input of a set of automatically selected initial conditions and model parameters;
a machine learning (ML) classifier configured to generate a score indicating whether the output data generated by the model is a simulated data or an observed data:
a sampler configured to output a set of the model parameters for input to the model; and
a meta-learner configured to be iteratively trained using a generative adversarial (GAN) training, comprising:
receive training data including input and output data of the ML classifier and the sampler; and
output update operations for the ML classifier and the sampler to update the model parameters input to the model,
wherein the meta-learner is trained in parallel with a training of the ML classifier.

10. The system of claim 9, wherein the model, the sampler, and the ML classifier are configured with historical training data using an Adversarial Network (AN) training operation.

11. The system of claim 10, wherein the meta-learner is configured with historical training data using at least one of a model-agnostic meta-learning operation or a continuous adaptation meta-learning operation.

12. The system of claim 9, wherein the model is configured to generate future weather data as the output data.

13. The system of claim 11, wherein the meta-learner is configured to receive:
inputs of parameter embeddings of the sampler and the ML classifier;
gradients used in a latest update of the sampler and the ML classifier; and
a value of an AN loss function.

14. A computer-implemented method of automatic updating of model parameters, the method comprising:
inputting an automatically selected initial condition information to a model;
inputting, by a sampler, automatically selected model parameters to the model;
iteratively training a meta-learner using a generative adversarial (GAN) training, comprising:
receiving from the model a model-generated data based on the model parameters and the initial condition information;
determining, by a machine learning (ML) classifier, a similarity between the model-generated data and an observed data; and
updating, by the meta-learner, the model parameters input to the model based on the similarity of the model-generated data to the observed data,
wherein the meta-learner is trained in parallel with a training of the ML classifier.

15. The computer-implemented method of claim 14, further comprising updating the model parameters based on a detected change in the initial condition information.

16. The computer-implemented method of claim 14, further comprising training the model, the sampler, and the ML classifier offline with historical training data using an Adversarial Network (AN) training algorithm.

17. The computer-implemented method of claim 16, further comprising training the meta-learner with training information comprising historical data.

18. The computer-implemented method of claim 17, wherein the training of the meta-learner includes updating model parameters based on the performance of a known discriminator and similarities to the observed data.

19. The computer-implemented method of claim 14, further comprising performing time-dependent partial differential equations (PDE) to create the model-generated data.

20. The computer-implemented method of claim 17, further comprising:
training the meta-learner with parameter embeddings of the sampler and the ML classifier, gradients used in a last update of the sampler and the ML classifier, and a value of an AN-loss function; and
training the meta-learner to manage updates of the sampler and the ML classifier.

* * * * *